United States Patent [19]

Blasi

[11] Patent Number: 5,211,092
[45] Date of Patent: May 18, 1993

[54] CUTTING FACILITY WITH AIR FLOAT TABLE

[76] Inventor: John Blasi, 332 S. Grand Dr., Apache Junction, Ariz. 85220

[21] Appl. No.: 937,984

[22] Filed: Aug. 28, 1992

[51] Int. Cl.$^5$ .................. B27G 21/00; B26D 7/06
[52] U.S. Cl. .................................... 83/98; 83/99; 51/240.6 B; 144/252 R; 144/286 R; 269/20; 414/676
[58] Field of Search ............ 51/240 R, 240.6 B; 83/98, 99; 144/252 R, 252 A, 286 R, 287; 269/20; 414/676; 198/375, 721

[56] References Cited

U.S. PATENT DOCUMENTS

| | | | |
|---|---|---|---|
| 3,143,016 | 8/1964 | Obenshain | 83/98 |
| 4,280,782 | 7/1981 | Stumpf | 269/20 |
| 4,354,798 | 10/1982 | Bergman | 269/20 |
| 4,444,541 | 4/1984 | Bergman | 269/20 |
| 4,644,833 | 2/1987 | Jenkner | 83/99 |
| 4,787,178 | 11/1988 | Morgan et al. | 83/98 |
| 5,123,317 | 6/1992 | Barnes, Jr. et al. | 83/98 |

*Primary Examiner*—W. Donald Bray
*Attorney, Agent, or Firm*—James F. Duffy

[57] ABSTRACT

An improved wood working facility has a table saw which is operated in combination with a table saw extension table. The extension table is provided with an array of orifices through which air is ejected to provide a buoyant support for boards and sheet material laid atop the extension table. An ordinary shop vacuum cleaner may be utilized as the source of air being expelled from the orifices. Air may also be received from a distribution system in the shop which distributes compressed air to the various machine sites. The air is provided to an air plenum below the extension table top and exits from the plenum via the multiplicity of orifices in the top of the table. A low surface frictional veneer on the table top adds to the effort reducing efficiency of the extension table.

10 Claims, 1 Drawing Sheet

CUTTING FACILITY WITH AIR FLOAT TABLE

BACKGROUND

1. Technical Field of the Invention

The invention relates to table saw table extensions. In particular it relates to a table saw extension having means for buoyantly supporting material to be cut on air exiting from orifices in the top of the table extension. The buoyantly supported material is easily maneuvered into the saw and maintained in the proper cutting attitude.

2. Prior Background Art

In using a table saw to cut boards and sheet materials, the boards and sheets must be supported as they are guided onto the table saw for cutting. Generally the work material will overhang the table saw. Thus, woodworkers have devised various table saw extensions to facilitate guiding material onto the table saw.

Frequently several saw horses will be roughed together to bear a flat surface set level with the top of the saw table. Materials to be cut are carried on the flat surface supported by the saw hoses. This method is one of expediency and seldom performs satisfactorily because of the friction between the material to be cut and the flat surface; and, because of the instability of the saw horse support.

A more expensive method of supporting material to be cut is made up of one or more steel rollers rotatedly clamped between steel rails. The rollers are typically supported upon adjustable pipe stands such that their height can be adjusted to match that of the table saw surface. Often, these pipe stand structures are unstable and will tip when the workmen bears down on a work piece in attempting to slide it into the saw blade.

For a workman to feed a sheet of material to the blade of a table saw, the workman must bear down on the sheet to hold it in contact with the surface of the table top of the saw. The sheet material must then be urged forward into the revolving saw blade. To assure a straight line cut, the sheet material must also be brought to bear against a guide fence which is set above the saw table and parallel to the cutting blade. Thus, in addition to lifting the sheet of material onto its support in the first instance, the workman must then push downwardly to hold the sheet against the table top, forwardly to guide the work piece into the blade, and laterally to guide the material against the guide fence. In the coarse of a day's work this effort can prove very fatiguing; and, often, the workman suffers injury to his back or exacerbates a weakened spine condition.

It is an objective of the invention to provide an extension of the work surface of a table saw such that material to be cut on the saw is supported in a low friction manner so as to ease the burden on the workman in guiding the material into the saw.

It is particular objective of the invention to provide means and method for buoyantly air supporting material to be cut on a table saw.

SUMMARY DESCRIPTION OF THE INVENTION

In summary, the invention is an improved cutting facility comprising the following combination.

A table saw for cutting boards and sheet stock. A source of air useful for clearing away wood chips and saw dust. And, a first table saw extension table for supporting the boards and the sheet stock.

The table saw extension table has a table top with a plurality of openings therethrough. There is an air plenum beneath the table top. The plurality of openings comprise output orifices for air exiting from the plenum. An air input couples air into the plenum, the source of air being coupled to the air input.

The first table saw extension table is positioned adjacent an input end of the table saw. At least one of the sheet stock and the board is buoyantly supported by air exiting the output orifices. Thus the sheet stock and the board may be readily and easily fed into the table saw and maintained at a proper cutting aspect because of the buoyant support provided by air exiting the orifices.

In a presently preferred embodiment the source of air comprises a shop vacuum having an input, vacuum port and an output, blower port. The output, blower port is coupled to the air input of the air plenum.

The source of air may be any source of compressed air maintained in the cutting facility for cleaning saw dust and chips from the table saw.

Ideally, but optionally, the table top includes a surface selected to minimize sliding friction between the table top and boards and the sheet stock.

Disclosed is an embodiment in which the plurality of openings comprising output orifices for air from the plenum comprise a array of orifices through the table top to the air plenum. The array of orifices extends from a first end zone of the table top through a central zone into a second end zone. The orifices in the array have selected diameters. In a preferred embodiment the diameters of the orifices have a diameter within the central zone selected to be larger than the diameters of the orifices in the first end zone.

A further improvement comprises a second table saw extension table positioned adjacent an output end of the table saw.

DETAILS OF BEST MODE FOR CARRYING OUT THE INVENTION

Figure 1:
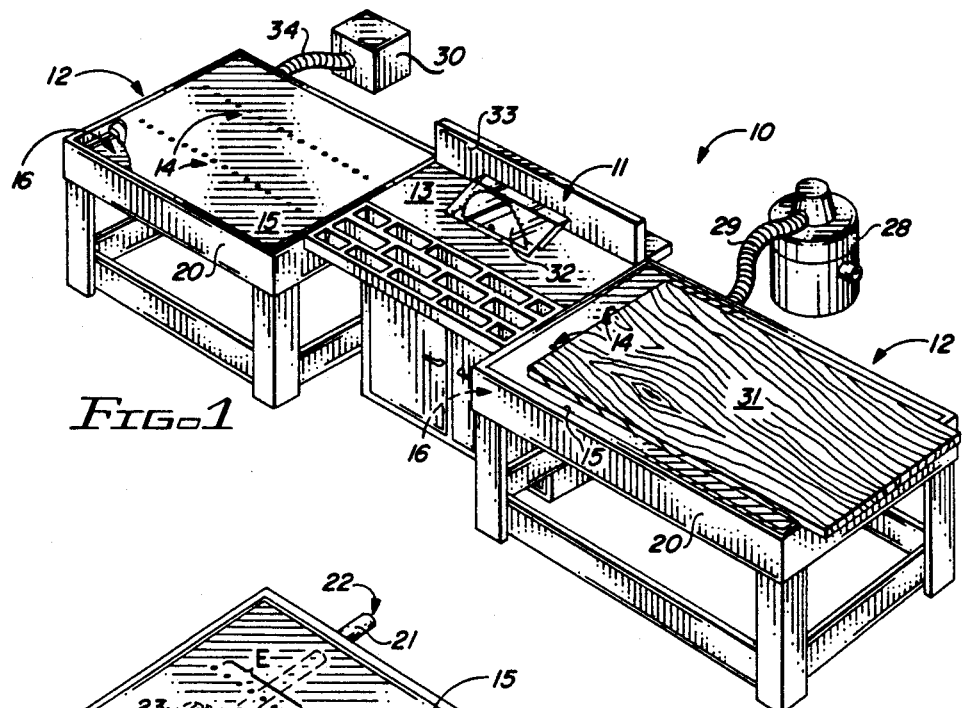
FIG. 1 is a top, right perspective view of a table saw utilizing two table saw extensions, each having means for buoyantly supporting material to be cut.

For purposes of promoting an understanding of the principles of the invention, reference will now be made to the embodiments illustrated in the drawings and specific language will be used to describe same. It will nevertheless be understood that no limitation of the scope of the invention is thereby intended. Alterations and modifications of the illustrated device are contemplated, as are such further applications of the principles of the invention as would normally occur to one skilled in the art to which the invention pertains.

The improved sawing facility 10 offered by the invention is here shown as a table saw 11 having a table top 13 along which material to be cut is guided into saw blade 32.

Often, large sheets of material 31 must be guided into saw blade 32. Since sheet material 31 often greatly exceeds the size of table 13 of saw 11, additional means of support for material 31 must be provided. To this end, table extension 12 is provided in the illustration of FIG. 1. Material 31 is first supported on extension table top 15. From here, a workman slidingly guides material 31 along table top 15 onto the table top 13 of saw 11. In order to slide pamaterial 31 along extension table top 15, the workman must overcome frictional contact between the material 31 and the extension table top 15.

To properly guide material 31 in a straight path of interception with saw blade 32, the workman must continue guiding material 31 forward into saw blade 32 while maintaining a constant contact with saw fence 33. Thus the workman must not only push the material 31 to the left of the illustration of FIG. 1, but must also apply a lateral force directing material 31 toward and against fence 33.

While the workman directs his efforts in sliding material 31 in a forward and lateral direction into blade 32, he must also maintain a downward pressure on material 31 so it bears securely on the surface of saw table 13 and will thus interact properly with saw blade 32 to produce a clean, well defined saw kerf. It is thus seen that minimizing the effects of friction between material 31 and the surfaces along which it slides will result in reduction in the effort required of the workman to move the material into saw blade 32.

To so reduce friction, the invention makes use of one or more arrays of orifices 14 through which air is jetted upwardly from the surface of extension table top 15. When sheet material 31 is placed top these arrays of orifices 14, the material tends to be buoyantly supported and glides readily on the pneumatic bearing provided by the cushion of air developed between the under surface of material 31 and extension table top 15.

In the illustration of FIG. 1, a first extension table 12 is shown to the right of the illustration. A sheet of material 31, to be cut by saw blade 32, is shown resting on the top surface 15 of extension table 12 such that most of the orifices in the array of orifices 14 are covered by sheet material 31. The orifice arrays 14 are more clearly discerned in the second extension table 12 shown to the left of the illustration of FIG. 1.

By way of exposition and not of limitation, the second extension table in FIG. 1 is shown to have two orifice arrays 14, each in linear alignment, which receive air from an air source. Because most wood working shops come equipped with one or more shop vacuum cleaners 28, a presently preferred embodiment of the invention, illustrated here in the drawings, makes use of shop vacuum 28 as the source of air for charging air plenum 16 with sufficient air to jet out and upwards from orifice arrays 14 to buoyantly support sheet material 31 when the sheet is placed on top of the orifice arrays 14 in an extension table 12. Thus, in FIG. 1, a shop vacuum 28 is shown with its exhaust hose 29 coupled to a first one of extension tables 12. As will be later disclosed, exhaust hose 29 is coupled to an air input port 22 which injects air into air plenum 16.

To provide a more general example of the use of a source of air injected into air plenum 16 of a table 12, extension table 12 to the left of the illustration of FIG. 1 is shown coupled by air outlet hose 34 to a conventional source of compressed air 30. Often workshops have a single source of compressed air which is distributed by piping about the shop to different machine sites. Thus, each workman has an air outlet and hose at his work site to aid in cleaning wood chips and the like at the machine at which he works. Thus, it is anticipated, that small shops will make ready use of a shop vacuum 28 to provide air to plenum 16 of table 12 while the larger, more integrated work facilities, will make use of a more conventional source of compressed air.

Figure 2:
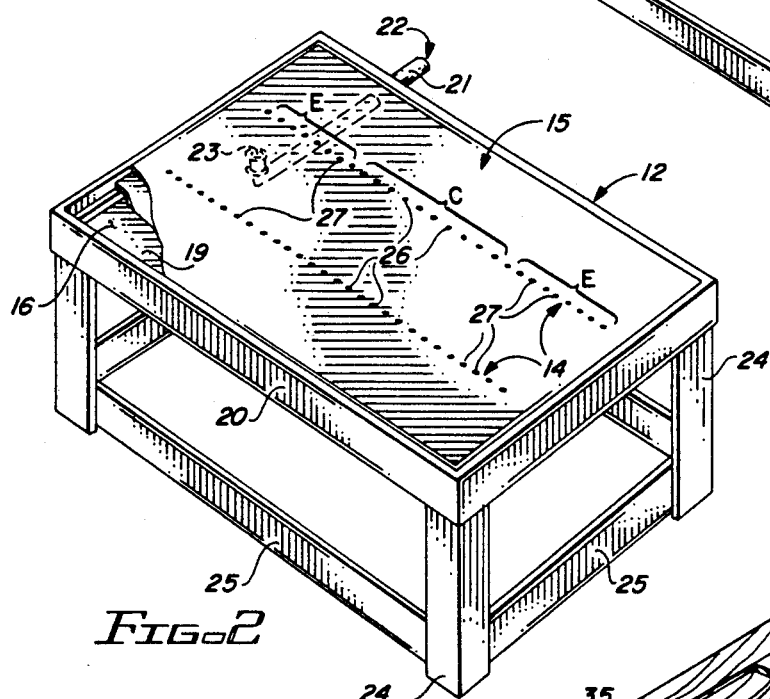
FIG. 2 is a top perspective view of a table saw extension having an array of orifices in its surface through which air is forced to provide a buoyant support for sheet material laid on top of the extension.

An extension table 12 is shown in greater detail in FIG. 2. The table is seen, again, to have a table top 15 and an internal air plenum 16, not shown. An air input pipe 21 enters into a side 20 of table 12 and has an output pipe 23 which continues on into air plenum 16. Air pipe 21 has an input 22 into which air is injected to exit within plenum 16 from air outlet 23. It is to the air inlet 22 of pipe 21 that the exhaust hose 29 of shop vacuum 28 or the outlet hose 34 of compressed air source 30 is coupled.

Extension table top 15 is supported by legs 24. The height of legs 24 is determined by the height of the table top 13 of saw 11. Support bracing 25 couples legs 24 to provide a sturdy work surface 15 upon which sheet material 31 may be supported and guided.

The surface of extension table top 15 is divided, for example, into three zones. There is a central zone denoted by the capital letter C and two end zones each denoted by the capital letter E. Orifices 26 in central zone C have larger diameters than the orifices 27 in end zones E. The enlargement of holes 26 in the central zone is not mandatory for efficient operation of the invention. However, since a greater portion of the weight of the material 31 being cut is supported as it approaches the center zone of table top 15, the increased air pressure provided by the larger orifice 26 proves beneficial to performance. By way of example and not of limitation, the diameters of the orifices 26 in the central zone were one-quarter inch in the prototype design. The diameters of orifices 27 in the end zones were one-eighth of an inch. The prototype with these diameter orifices worked admirably.

Figure 3:
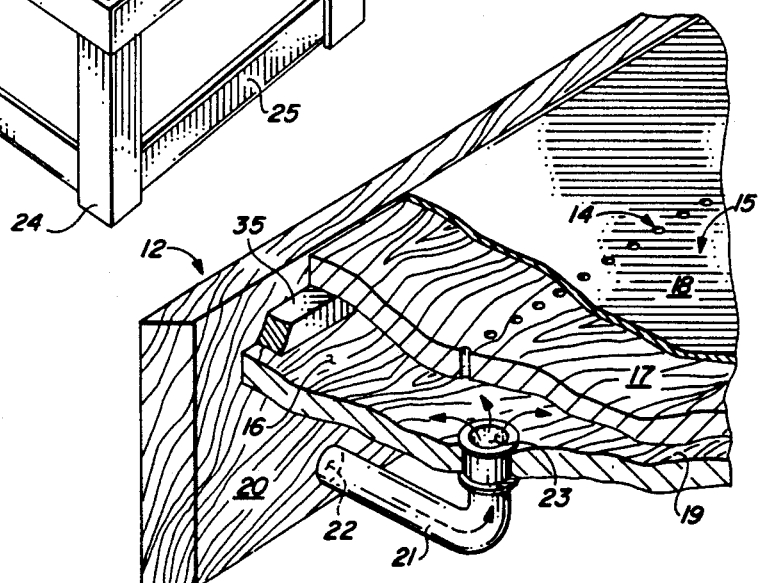
FIG. 3 is a detail of the construction of the table saw extension showing the air plenum into which air is injected and the orifices in the top of the table through which air is ejected so as to buoyantly support sheet material laid atop the extension table.

A detail of the interior construction of extension table 12 is shown in the partial, cross-sectional view of FIG. 3.

Table top 15 is affixed to the sides 20 of table 12. Table top 15 has a support base 17 which is preferably, and optionally, covered with a low surface veneer. A material such as that sold under the trademark FORMICA provides a wear resistant, low friction surface.

One or more spaces 35 support and separate table top base 17 and air plenum base 19, the air plenum 16 being defined by the void thus created between table top base 17 and air plenum base 19. One or more orifice arrays 14, as earlier disclosed, is placed in table top base 17 and any low friction surface veneer 18. The orifices in orifice array 14 permit the accelerated exit of air from air plenum 16.

An air injection pipe 21 has a first input end 22 coupled to table side 20 and a second output end 23 coupled into air plenum 16. When the shop vacuum blower hose 29 or the compressed air outlet hose 34 is connected to the input end 22 of pipe 21 air passes upward to exit from pipe outlet 23 into air plenum 16. This inrush of air into air plenum 16 raises the air pressure within air plenum 16 and causes the air to exit from orifices 10 and 11 in orifice array 14. As is well known to those skilled in the art, fluids which are restrained to flow through a constricted opening are accelerated in their flow. The accelerated flow of air from the orifices of array 14 will provide a buoyant cushion of air to support a board or sheet of material laid atop extension table top 15.

Returning to the illustration of FIG. 1, a second table saw extension table 12, is indicated at the output end of table saw 11, that is to the left of the saw as illustrated. Because large sheets of material along boards tend to overlap and pivot about the edge of table saw table 13, the added support provided by the leftmost table 12 eases the burden of the workman in passing sheet material 31 through saw blade 32. The second table 12 is constructed in a similar manner to that of the first one having one or more air orifice arrays 14. Thus, the sheet material which has already passed through and passed rotating saw blade 32 would travel on to the second of the two extension tables and receive the low friction, buoyant support provided by air exiting the orifices in that table.

What has been disclosed is an improved wood working facility in which a table saw is operated in combination with a table saw extension table. The extension table is provided with an array of orifices through which air is ejected to provide a buoyant support for boards and sheet material laid atop the extension table. An ordinary shop vacuum cleaner may be utilized as the source of air being expelled from the orifices. Air may also be received from a distribution system in the shop which distributes compressed air to the various machine sites. The air is provided to an air plenum below the extension table top and exits from the plenum via the extension table top and exits from the plenum via the multiplicity of orifices in the top of the table. A low surface frictional veneer on the table top adds to the effort reducing efficiency of the extension table.

Those skilled in the art will conceive of other embodiments of the invention which may be drawn from the disclosure herein. To the extent that such other embodiments are so drawn, it is intended that they shall fall within the ambit of protection provided by the claims herein.

Having described the invention in the foregoing description and drawings in such clear and concise manner that those skilled in the art may readily understand and practice the invention, that which is claimed is:

1. An improved cutting facility comprising, in combination:
    a table saw for cutting boards and sheet stock;
    a source of air useful for clearing away wood chips and saw dust;
    a first table saw extension table for supporting said boards and said sheet stock;
    said table saw extension table having a table top having a plurality of openings therethrough;
    an air plenum beneath said table top, said plurality of openings being output orifices for air from said plenum;
    an air input for coupling air into said plenum, said source of air being coupled to said air input;
    said first table saw extension table being positioned adjacent an input end of said table saw; and
    at least one of said sheet stock and said board buoyantly supported by air exiting said output orifices;
    whereby said at least one of said sheet stock and said board may be readily and easily fed into said table saw and maintained at a proper cutting aspect because of said buoyant support.

2. The cutting facility of claim 1 wherein said source of air comprises a shop vacuum having an input, vacuum port, and an output, blower port, said output, blower port being coupled to said air input of said air plenum.

3. The cutting facility of claim 1 wherein said source of air comprises a source of compressed air maintained in said cutting facility for cleaning saw dust and chips from said table saw.

4. The cutting facility of claim 1 wherein said table top includes a surface selected to minimize sliding friction between said table top and said boards and said sheet stock.

5. The cutting facility of claim 1 said plurality of openings comprising output orifices for air from said plenum comprise an array of orifices through said table top to said air plenum, said array of orifices extending from a first end zone of said table top through a central zone into a second end zone, said orifices in said array having selected diameters.

6. The cutting facility of claim 5 wherein said diameters of said orifices have a diameter within said central zone selected to be larger than the diameters of said orifices in said first end zone.

7. The cutting facility of claim 1 comprising a second said table saw extension table positioned adjacent an output end of said table saw.

8. An improved cutting facility comprising, in combination:
    a table saw for cutting boards and sheet stock;
    a source of air useful for clearing away wood chips and saw dust;
    a first table saw extension table for supporting said boards and said sheet stock;
    said table saw extension table having a table top having a plurality of openings therethrough;
    an air plenum beneath said table top, said plurality of openings being output orifices for air from said plenum;
    an air input for coupling air into said plenum, said source of air being coupled to said air input;
    said first table saw extension table being positioned adjacent an input end of said table saw;
    at least one of said sheet stock and said board buoyantly supported by air exiting said output orifices;
    said plurality of openings comprising output orifices for air from said plenum further comprise an array of orifices through said table top to said air plenum, said array of orifices extending from a first end zone of said table top through a central zone into a second end zone, said orifices in said array having selected diameters; and
    said source of air comprises a source of compressed air maintained in said cutting facility for cleaning saw dust and chips from said table saw;
    whereby said at least one of said sheet stock and said board may be readily and easily fed into said table saw and maintained at a proper cutting aspect because of said buoyant support.

9. The cutting facility of claim 8 wherein said source of air comprises a shop vacuum having an input, vacuum port and an output, blower port, said output, blower port being coupled to said air input of said air plenum.

10. The cutting facility of claim 9 wherein said table top includes a surface selected to minimize sliding friction between said table top and said boards and said sheet stock.

* * * * *